United States Patent
Averay

(10) Patent No.: US 11,438,066 B2
(45) Date of Patent: Sep. 6, 2022

(54) MULTICHANNEL SOFTWARE DEFINED RADIO RECEIVER WITH OPTICALLY ISOLATED ADC

(71) Applicant: BAE Systems Australia Limited, Edinburgh (AU)

(72) Inventor: Robert Dennis Averay, Alice Springs (AU)

(73) Assignee: BAE Systems Australia Limited, Edinburgh (AU)

(*) Notice: Subject to any disclaimer, the term of this patent is extended or adjusted under 35 U.S.C. 154(b) by 104 days.

(21) Appl. No.: 16/966,238

(22) PCT Filed: Feb. 8, 2019

(86) PCT No.: PCT/AU2019/050100
§ 371 (c)(1),
(2) Date: Jul. 30, 2020

(87) PCT Pub. No.: WO2019/153049
PCT Pub. Date: Aug. 15, 2019

(65) Prior Publication Data
US 2021/0050921 A1 Feb. 18, 2021

(30) Foreign Application Priority Data
Feb. 8, 2018 (AU) .............................. 2018900386

(51) Int. Cl.
*H04W 4/00* (2018.01)
*H04B 10/2575* (2013.01)
(Continued)

(52) U.S. Cl.
CPC ..... *H04B 10/25753* (2013.01); *H04B 1/0003* (2013.01); *H04B 1/52* (2013.01); *H04W 88/085* (2013.01); *H04B 2001/3811* (2013.01)

(58) Field of Classification Search
CPC .......... H04B 1/0003; H04B 1/06; H04B 1/38; H04B 1/52; H04B 7/02; H04B 10/2575;
(Continued)

(56) References Cited

U.S. PATENT DOCUMENTS 9,125,047 B2 * 9/2015 Sundaresan ........... H04W 24/02
9,258,629 B2 * 2/2016 Graves ............... H04Q 11/0062
(Continued)

FOREIGN PATENT DOCUMENTS

CN    102833000 A    12/2012
CN    103916877 A    7/2014
(Continued)

OTHER PUBLICATIONS

Peng et al., Recent Advances in Cloud Radio Access Networks: System Architectures, Key Techniques, and Open Issues, IEEE, 28 pages, Apr. 2016.*
(Continued)

*Primary Examiner* — Frank Duong
(74) *Attorney, Agent, or Firm* — Maine Cernota & Rardin

(57) ABSTRACT

A high speed split receiver interface system for sensing a series of external signals, the system including: a series of remote radio head units for receiving a sensed signal in an analog electric form, each of the remote radio head units converting their sensed signal to a corresponding digital electrical form and then to a corresponding optical data form for dispatch over an optical data interconnection; at least one optical interconnect interconnecting each remote radio head unit with a baseband unit; a first baseband unit interconnecting the series of remote head units corresponding optical interconnects, and including a converter for conversion of the received optical signals to corresponding electrical digital form and down sampling the optical signals to corresponding down sampled signals, a memory store for storing
(Continued)

the down sampled signals, and an external network interface for transmission of the saved signals to an external device.

4 Claims, 5 Drawing Sheets

(51) Int. Cl.
*H04B 1/00* (2006.01)
*H04B 1/52* (2015.01)
*H04W 88/08* (2009.01)
*H04B 1/3805* (2015.01)

(58) Field of Classification Search
CPC ........ H04B 10/25752; H04B 10/25753; H04B 2001/3811; H04W 16/02; H04W 16/32; H04W 24/02; H04W 84/042; H04W 88/08; H04W 88/085
See application file for complete search history.

(56) References Cited

U.S. PATENT DOCUMENTS

| | | | |
|---|---|---|---|
| 9,553,954 B1 | 1/2017 | Akhter et al. | |
| 10,374,764 B2 * | 8/2019 | Liu | H04L 5/001 |
| 2010/0087227 A1 | 4/2010 | Francos et al. | |
| 2011/0013714 A1 | 1/2011 | Tamaki et al. | |
| 2014/0355991 A1 | 12/2014 | Cameirao et al. | |
| 2015/0229397 A1 | 8/2015 | Shibata et al. | |
| 2016/0128085 A1 | 5/2016 | Liu et al. | |
| 2017/0288828 A1 * | 10/2017 | Liu | H04L 27/26526 |
| 2018/0234875 A1 * | 8/2018 | Leroudier | H04L 25/02 |
| 2018/0255552 A1 * | 9/2018 | Luo | H04W 72/0433 |

FOREIGN PATENT DOCUMENTS

| | | |
|---|---|---|
| EP | 3007373 A1 | 4/2016 |
| WO | 2016123751 A1 | 8/2016 |
| WO | 2016145371 A2 | 9/2016 |
| WO | 2016202246 A1 | 12/2016 |
| WO | 2017091468 A1 | 6/2017 |

OTHER PUBLICATIONS

Stuber et al., Broadband MIMO-OFDM Wireless Communications, IEEE, 24 pages, Feb. 2004.*
International Preliminary Report on Patentability for Patent Appl. No. PCT/AU2019/050100, dated Aug. 11, 2020, 7 Pages.
International Search Report and Written Opinion for PCT Appl. No. PCT/AU2019/050100, dated Apr. 29, 2019, 14 Pages.

* cited by examiner

MULTICHANNEL SOFTWARE DEFINED RADIO RECEIVER WITH OPTICALLY ISOLATED ADC

RELATED APPLICATIONS

This application is a national phase application filed under 35 USC § 371 of PCT Application No. PCT/AU2019/050100 with an International filing date of Feb. 8, 2019 which claims priority of AU Patent Application 2018900386 filed Feb. 8, 2018. Both of these applications are incorporated herein by reference in their entirety for all purposes.

FIELD OF THE INVENTION

The present invention provides for systems and methods for providing a flexible multichannel software defined radio receiver which is optically isolated.

BACKGROUND OF THE INVENTION

Any discussion of the background art throughout the specification should in no way be considered as an admission that such art is widely known or forms part of common general knowledge in the field.

Radio receivers are often packaged in one of two forms: as a monolithic unit with all components contained in the same box, or as a split system. A typical split system consists of a remote radio head (RRH) placed close to an antenna element, a baseband unit (BBU) generally placed near the primary point of interconnect to a wider network, and a medium (shared or point-to-point) connecting the RRH and BBU for the transfer of received information.

The split-system design is common within the telecommunications industry where both receive and transmit components are co-located within the RRH. The RRH is inherently a complex product, since multiple RRHs can share a single BBU with limited bandwidth available in the medium connecting the RRH(s) and BBU. Signals are often down or up converted at the RRH, which imposes a minimum computational workload on the RRH that translates to power and heat dissipation concerns. In some applications these are unacceptable restrictions to attain desired functionality.

SUMMARY OF THE INVENTION

It is an object of the invention, in its preferred form to provide an improved form of multi channel software defined radio receiver.

In accordance with a first aspect of the present invention, there is provided a high speed split receiver interface system for sensing a series of external signals, the system including: a series of remote radio head units for receiving a sensed signal in an analog electric form, each of the remote radio head units converting their sensed signal to a corresponding digital electrical form and then to a corresponding optical data form for dispatch over an optical data interconnection; at least one optical interconnect interconnecting each remote radio head unit with a baseband unit; a first baseband unit interconnecting the series of remote head units corresponding optical interconnects, and including a converter for conversion of the received optical signals to corresponding electrical digital form and down sampling the optical signals to corresponding down sampled signals, a memory store for storing the down sampled signals, and an external network interface for transmission of the saved signals to an external device.

In some embodiments, there is also provided, a series of antenna devices interconnected to the remote radio head units for sensing an external environment.

In some embodiments, the optical interconnect provides a one way connection of data only, from the series of remote radio head units to the corresponding first baseband unit.

The system can further provide a series of baseband units interconnected to the first baseband unit, for further down sampling of the received optical signal.

BRIEF DESCRIPTION OF THE DRAWINGS

Embodiments of the invention will now be described, by way of example only, with reference to the accompanying drawings in which.

DETAILED DESCRIPTION

The preferred embodiments provide for a system and method which provide for a variation of the split-system topology which is tailored for receive-only applications, such as spectrum monitoring, data acquisition or in-system RF chain diagnosis. The embodiments feature a greatly simplified RRH, as digital down conversion is shifted back to the BBU and up conversion circuitry is eliminated as it is not required. The function of the RRH is therefore limited to digitisation of the raw samples from an analogue to digital converter (ADC), transfer of the raw samples over a fibre-optic link back to the BBU, and unit status information.

Figure 1:
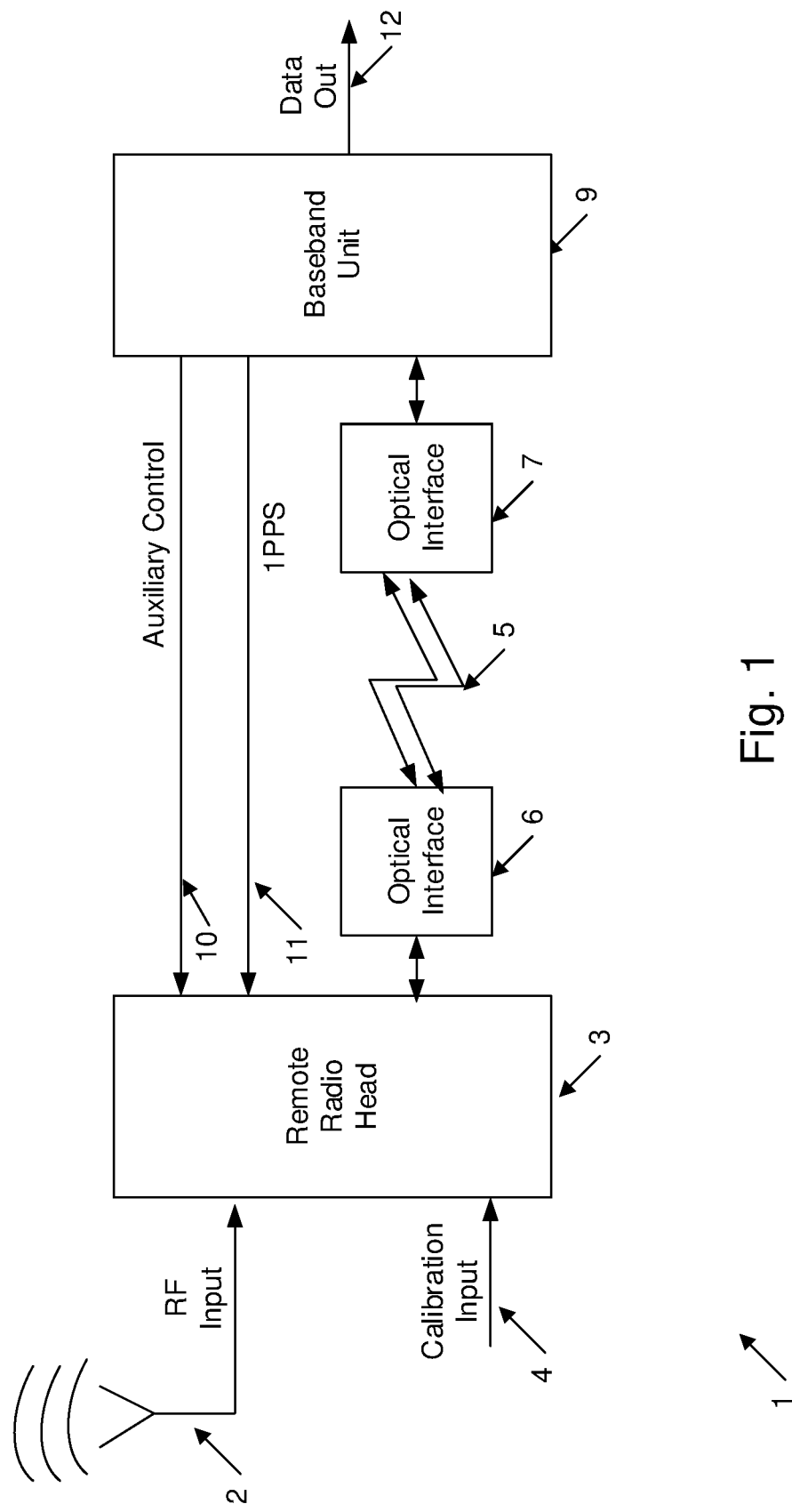
FIG. 1 is a schematic illustration of the interconnection of Remote Radio Head Units with a Baseband unit.

Turning initially to FIG. 1, there is illustrates an example arrangement 1. An input antenna signal 2 is input to an RRH unit 3 in addition to calibration input 4. The RRH unit is responsible for signal conversion into a digital form in a synchronised manner under the control of Auxillary control signal 10 and 1PPS timing signal 11 which are output from a BBU 9. The signals can originate from either a BBU or an external facility unit co-located with the RRH. The latter allows for the optical link to be uni-directional. The RRH outputs a signal which is optically converted by optical interface 6 for transmission to BBH optical interface 7. The BBU is responsible for downsampling and transmission 12 of the received data to an external network.

A fibre-optic link 5, 6, 7 can be built for purpose, using commonly available optical Small Form-factor Pluggable (SFP) modules as a physical layer. An ADC converts the band-limited spectrum into digital samples as defined by the front-end stage of the RRH 3. The optical interface receives the digitised spectrum and, in addition with inputs from a management controller constructs an 8b/10b encoded serial stream, typically between 3 Gbit to 10 Gbit per second (depending on ADC sample clock) then transmits this over a single optical fibre 5. The optical fibre run can be up to 80 km long, however most practical applications use lengths between 1 to 7 km with a sample clock ranging between (but not limited to) 100 to 160 MHz.

The RRH 3 has two mechanisms for accepting commands from the BBU 12, only one of which is active at any one time. First, is a control packet sent over the fibre-optic interface 6, 7 (by either a second fibre or another wavelength on one fibre); the second is a discrete control interface 10, 11, to the integrated unit manager that interacts with an external piece of hardware, such a facility management unit within the shelter that contains the RRH. In this circumstance, the fibre optic link to the BBU is physically unidirectional.

When collecting samples continuously, a timestamping mechanism is required in order to ascertain at what time a particular sample was created. The embodiments provide the provision of a synchronisation signal at either the RRH 3 (within the shelter), or directly at the BBU 10, 11. This increases the practical configurations of the system.

Figure 2:
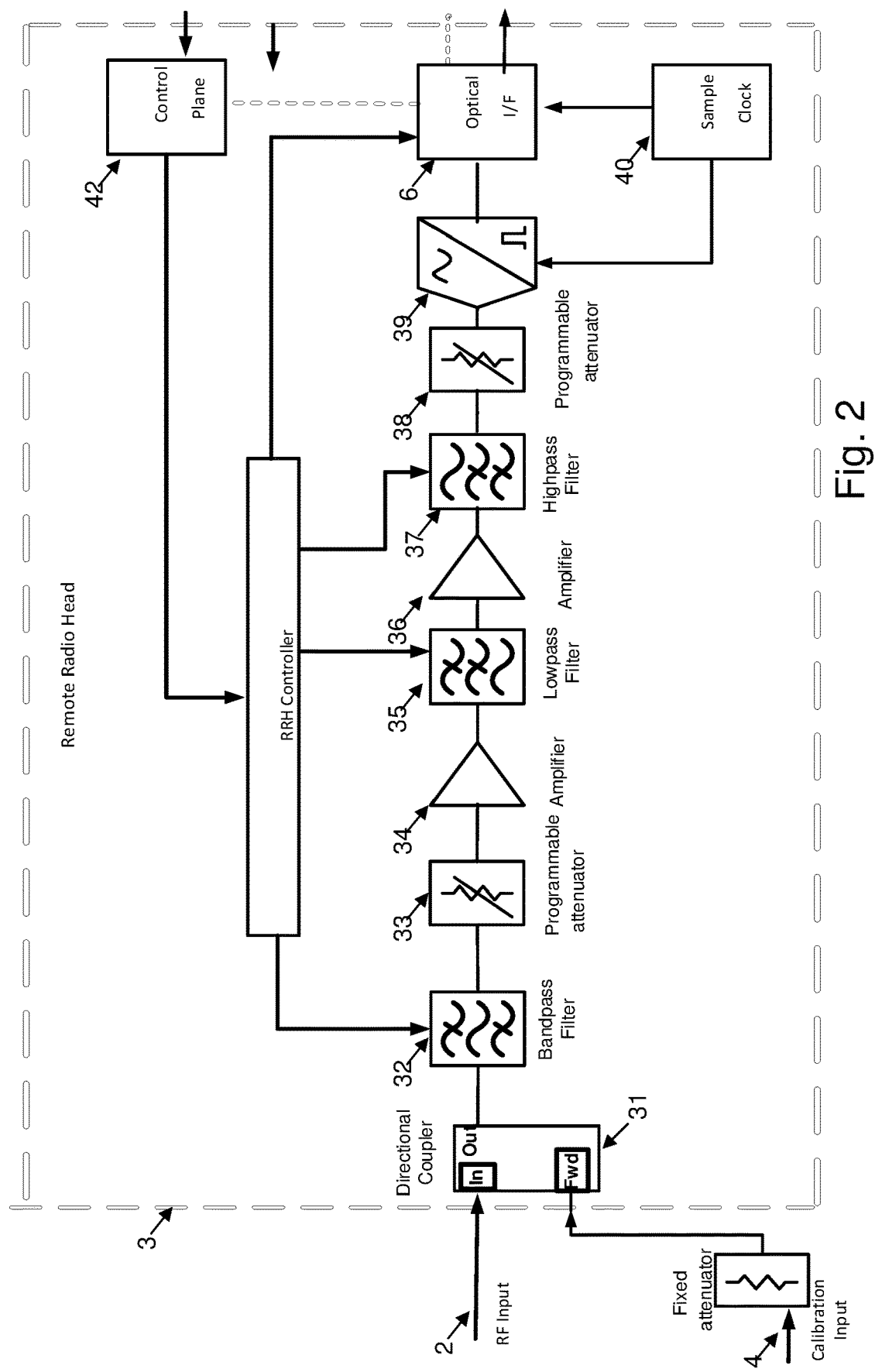
FIG. 2 illustrates a Remote Radio Head Unit in more detail.

Turning now to FIG. 2, there is illustrated the RRH 3 in more detail. In the example arrangement, the antenna input signal is fed through a coupler 31 for initial attenuation. The coupler allows for a local gain/phase calibration signal to be injected into the same path as the antenna element for on-line diagnosis. It is then subjected to a number of filtering, attenuation and amplification effects to extract a band pass of interest, before being subjected to A/D conversion 39 to a digital form. The sample rate of the A/D converter can be driven by a sample clock 40 whose speed is controlled by an external control signal via control input 42. The ADC can be at a fixed sample rate determined by the external sample clock. The control plane 42 only parses external commands to change the state of the RF path or optical stream parameters. The digital signal is forwarded to Electrical to optical interface 6 for dispatch over optical fiber.

Figure 3:
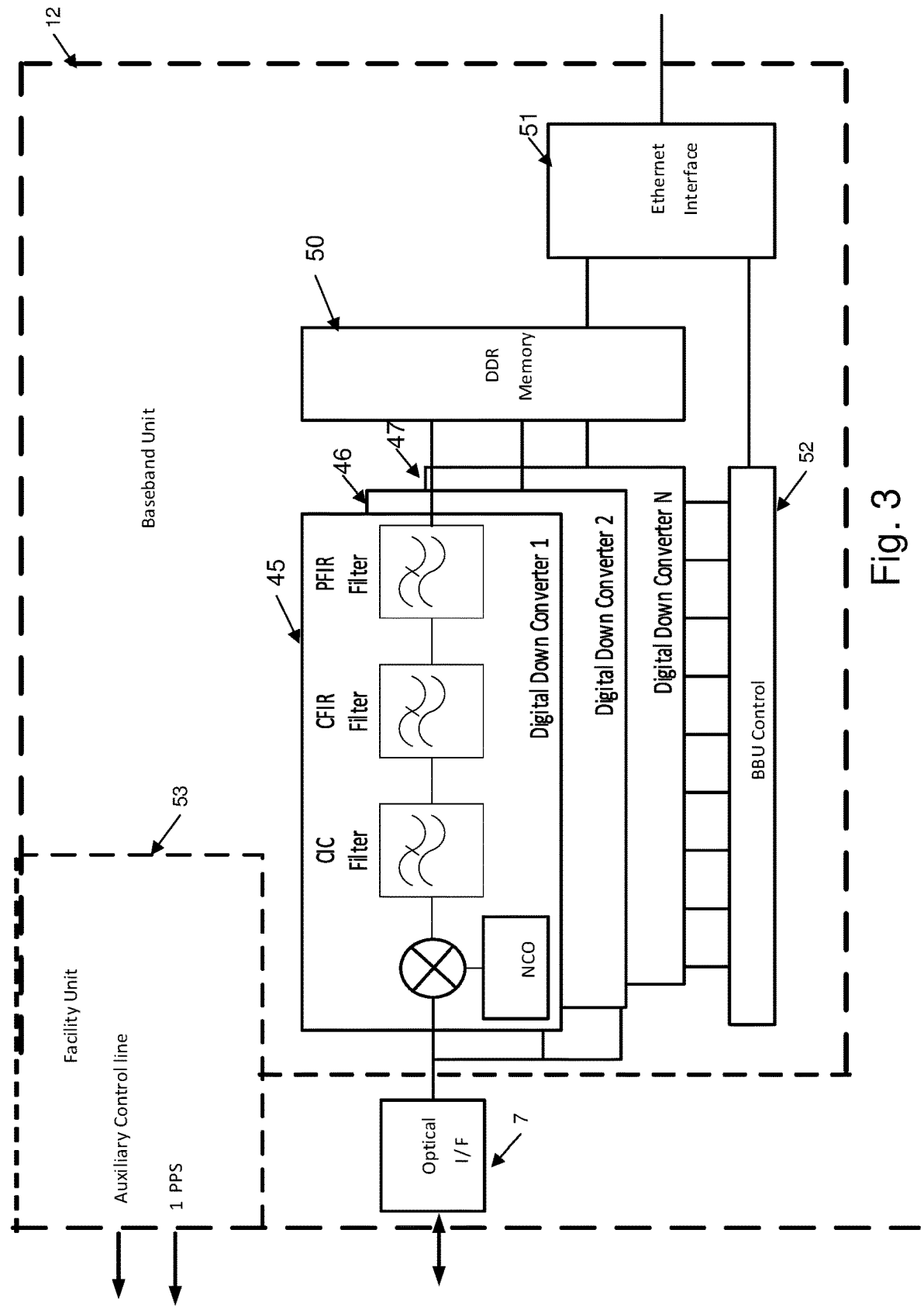
FIG. 3 illustrates the Baseband Unit in more detail.

Turning now to FIG. 3, there is shown the baseband unit (BBU) in more detail. The BBU includes the optical to electrical interface 7 for initial conversion of the optical signal to a corresponding digital electrical form. Subsequently, the digital signals are subjected to a series of digital down conversion 45-47 under control of BBU control unit 52, before being output to DDR memory 50. Subsequently, the received information can be transmitted externally via Ethernet interface 51.

The following capabilities are introduced by the embodiments:

Expansion

Each BBU contains a set of software programmable digital down converters (DDC) e.g. 45-47 for converting slices of the digitised spectrum into baseband I/Q samples for further signal processing. There may be circumstances where a single BBU may not have sufficient DDCs to perform a particular task off of a single RRH stream. Rather than replacing the BBU with a model with more DDCs, there is provided a daisy-chaining mechanism that leverages the unidirectional mode of the RRH fibre optic stream. By utilising the unused optical transmitter in each BBU, the stream from a single RRH can be repeated to multiple BBUs using fibre-optic patch leads allowing those BBUs to contribute their DDCs to the signal processing chain on the same stream.

Figure 4:
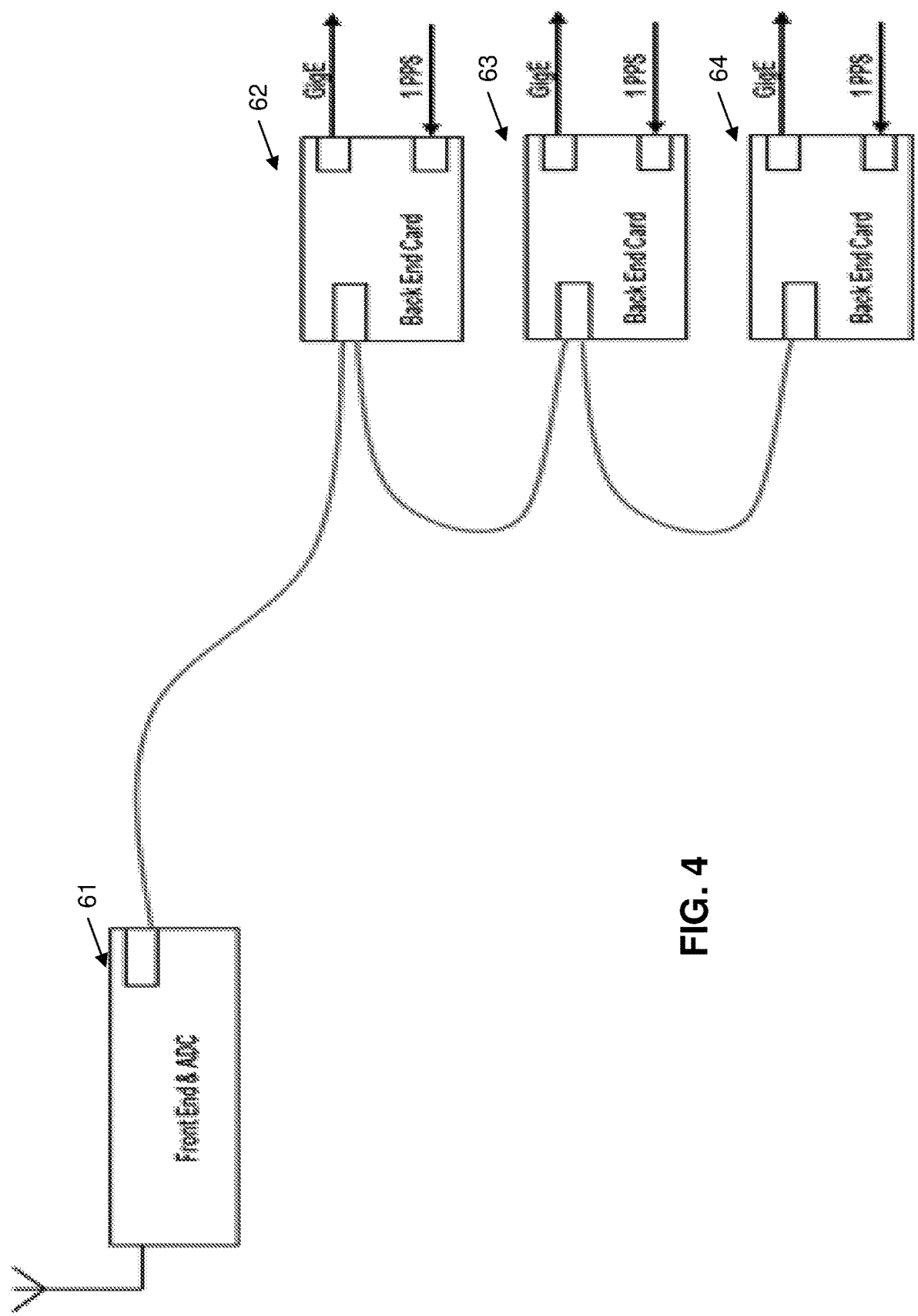
FIG. 4 illustrates a first architecture for chaining Baseband Units.

FIG. 4 illustrates one such arrangement 60, wherein a first front end card 61 is able to drive a series of back end cards 62-64 which are able to apply further digital down sampling and processing of the digital stream.

Data Isolation

The BBUs can be connected to a wider network which contains Signal Processing Computers. Often this connection is achieved through industry standard protocols (I.E. Ethernet) and may have administrative restrictions imposed on nodes which require connection to a given network. Some applications even consider the DDC parameters as sensitive information, and wish to limit the distribution of those parameters as much as possible. Splitting the receiver in the traditional sense would extend the network boundary to the RRH, which may be physically located in areas contrary to the network security policy and may introduce potentially burdensome administrative overheads to installations where the embodiments are deployed.

By virtue of the unidirectional optical link and built-for-purpose design, the installation of this embodiment restricts to the network boundary to the BBU allowing the RRH and its associated shelter to be installed without impacting local network security policy. The facility unit required to control the RRH can be on a completely separate network or operate on an autonomous schedule basis. In a similar vein, proving that the link is purely unidirectional and that the RRH has no knowledge of DDC parameters provides greater security confidence than having a bi-directional link claims to not radiate back up out the connected antenna.

Installation Diversity

Figure 5:
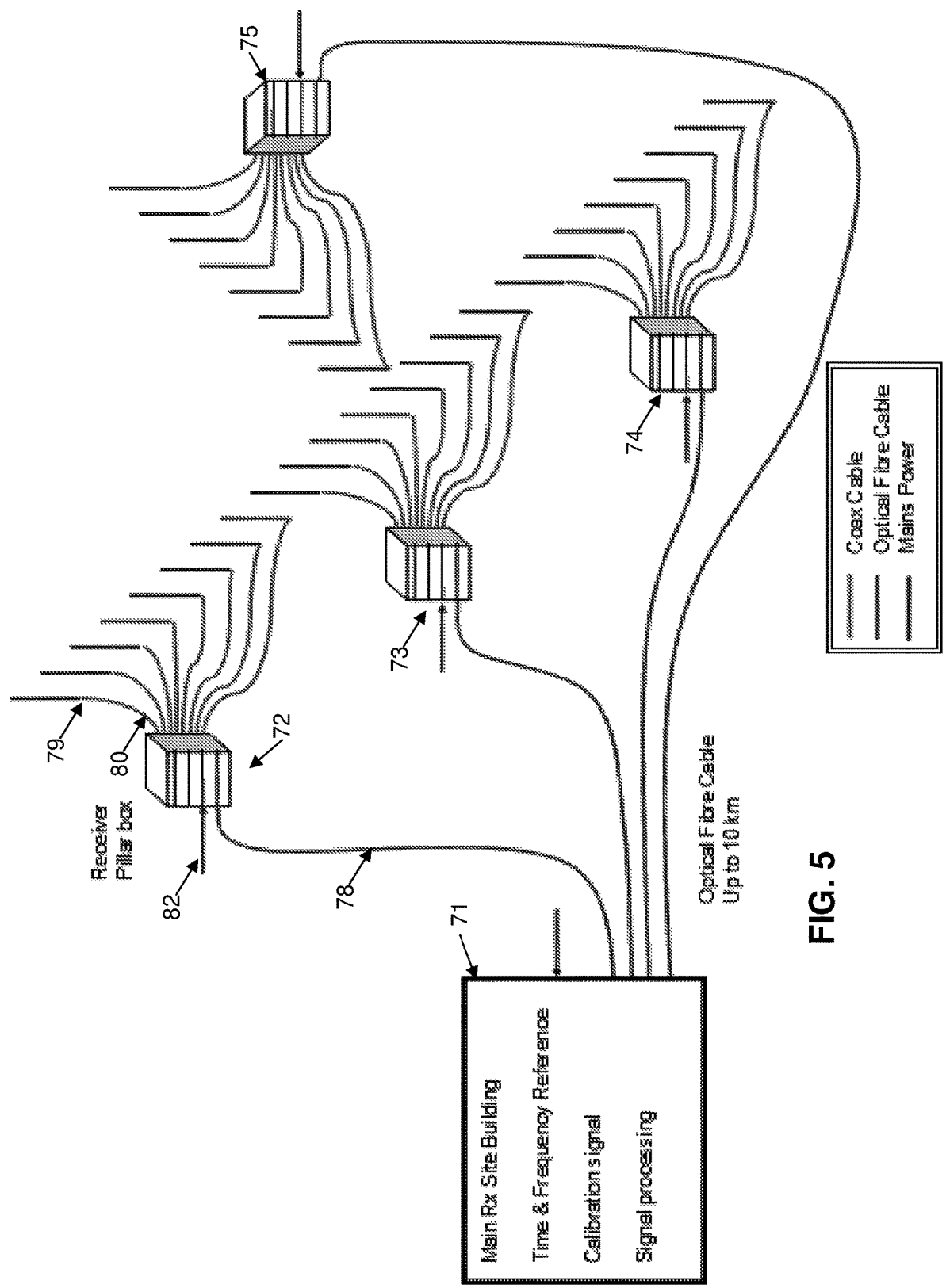
FIG. 5 illustrates a one arrangement of multiple RRH units connected to a single BBU.

This embodiment allows digital split receivers to be installed in physically diverse configurations. One such arrangement is as illustrated in FIG. 5. In this arrangement, a main BBU unit 71 housed in a main building is used to drive a series of RRH units 72-75 which are housed remotely and interconnected by optical cables e.g. 78. The RRH units are, in turn, each used to drive a series of antenna devices e.g. 79, which are interconnected to the RRH units by coaxial cables 80. Each RRH can drive multiple antenna devices and receive mains power input 82.

The low computational requirements of individual RRHs dramatically reduce power requirements as compared with a monolithic receiver or traditional RRH. This in turn reduces the facilities requirements for power reticulation and cooling leading to cost savings or opportunities to use facilities that otherwise would have been discounted.

The unidirectional fibre optic link to the BBU dramatically reduces the amount of coaxial cable required to be run to the antenna element, hence significantly reducing installation costs. Additionally the diameter of fibre optic strands are on average less than 1/10th of quality low-loss coax. By virtue of data isolation, the network boundary is not extended when used in unidirectional mode which allows connectivity to networks with a security policy. Optical isolation allows the RRHs to be installed in environmentally hazardous environments without putting additional risk on the comparatively expensive BBU and signal processing computers on the connected network.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A high speed split receiver interface system for sensing a plurality of external signals, the system including:
   a plurality of remote radio head units configured for receiving a sensed signal in an analog electric form, each of the remote radio head units being configured to convert its sensed signal into a corresponding raw digital electrical form and then into a corresponding raw optical data form suitable for dispatch as optical signals over an optical data interconnection;
   at least one optical interconnect simultaneously interconnecting a first baseband unit with each of the remote radio head units;
   said first baseband unit including:
      a plurality of digital down converters, each of which is configured to convert a slice of a received spectrum of the optical signals into corresponding electrical digital form and to down sample the optical signals to corresponding down sampled I/Q signals;
      a memory store configured for storing the down sampled signals; and
      an external network interface configured for transmission of the saved signals to an external device.

2. The system of claim 1, a wherein a plurality of antenna devices is interconnected to a first of the remote radio head units and configured for sensing an external environment.

3. The system of claim 1, wherein said optical interconnect provides a one-way connection of data only from the plurality of remote radio head units to the first baseband unit.

4. The system of claim 1, further comprising a second baseband unit interconnected to the first baseband unit and configured for further down sampling of the received optical signal.

* * * * *